Patented Apr. 6, 1937

2,076,381

UNITED STATES PATENT OFFICE 2,076,381

PROCESS FOR MANUFACTURING METAL BODIES

Theodore Millner, Ujpest, and Paul Túry, Budapest, Hungary, assignors to General Electric Company, a corporation of New York No Drawing. Application April 11, 1933, Serial No. 665,620. In Germany and Hungary April 22, 1932

3 Claims. (Cl. 148—13)

Our invention relates to a process for manufacturing metal bodies such as filaments for electric incandescent lamps and similar articles. The object of our invention is to provide a process for manufacturing metal bodies such as filaments comprising a single crystal or several large crystals.

Various processes have already been proposed for manufacturing filaments of a single crystal or of several large crystals. Most of these processes comprise admixing with a finely divided filament material, such as tungsten, substances which remain behind in the filamentary body up to the sintering temperature or even up to higher temperatures. Heat treatment combined with mechanical treatment has also been suggested. According to another process the metal in powder form is made into bars by molding and sintering and then annealed at a temperature close to the melting point in an atmosphere of reducing gas with which is mixed oxygen, or an oxygen containing gas, such as water vapor, until the conversion into a large crystal structure is complete. The annealing step in this process requires from a half hour to several hours.

According to our invention metal bodies such as rods, blocks and filaments of a single crystal or several large crystals are produced by bringing the said bodies, during the course of their formation from powder and during their heat treatment in a reducing or inert and carefully purified atmosphere at the temperature of rapid crystal growth, into contact with an otherwise reducing or inert gas containing oxygen or an oxygen-bearing compound. The bodies may then be further heated, if necessary, in a reducing or inert atmosphere. The advantages of this process are: The manufacture of metal bodies of large crystal structure without the use of additive materials, without necessarily combining any special mechanical treatment with the heat treatment, at considerably lower temperatures than the melting point, within a very much shorter time than has been heretofore required and independently of the grain distribution of the metal powder employed.

A specific example of producing tungsten bodies having a large-crystal structure is carried out as follows: Tungsten metal powder is prepared from tungstic acid in the well-known manner by reduction with hydrogen and is formed into rod-shaped blanks in a manner which is also well known. The said blanks are sintered at an increasing temperature by passing therethrough an alternating electric current of low voltage and high current strength, in a stream of dry and carefully purified hydrogen. At the temperature of rapid crystal growth, approximately 2000° to 2200° C. in tungsten (about 1000° below the melting point), hydrogen saturated at room temperature with water vapor is brought in contact with the metal body or blank for a short time, approximately one minute, whereupon the formation of large crystals begins at once. If necessary, further heat treatment in a carefully purified atmosphere of dry hydrogen or inert gas may follow the last step.

For the production of large crystal tungsten filaments the process may be carried out in the following manner. Coarse-grained tungsten powder, prepared in the well-known way from tungstic acid by reduction with hydrogen, is formed into rods which are then sintered in a stream of dry and carefully purified hydrogen by means of an alternating electric current. The sintering is continued only until the metal reaches the stage at which it can be worked by hammering and drawing. Experience has shown that it is sufficient for this purpose to carry the strength of the current up to only about 80% of that necessary for actual melting down. The specific gravity of rods sintered in this way, and also of wires produced therefrom by hammering and drawing, is appreciably lower than that of a dense or compacted tungsten body, so that wires produced in this way can be still further sintered in the course of further heat treatment. The wires drawn in this way, or helical filaments made therefrom, are raised to a high degree of incandescence in a stream of dry and carefully purified hydrogen by means of an electric current and are subjected at the temperature of rapid crystal growth or recrystallization, for a short time, to the action of hydrogen saturated with water vapor. The result is a large crystal structure in the wire or filament.

Probably, in the new process, the crystal forming action of the oxygen-containing atmosphere arises from the fact that, owing to the influence of the oxygen-bearing gas (water vapor in the examples cited), small quantities of tungsten oxide are formed in the incompletely compacted metal bodies during the rapid growth of the crystal, the said quantities of tungsten oxide setting up internal stresses which bring about the formation of large crystals in the course of the annealing treatment, due to their vapor pressure.

The process according to this invention results, in the case of undoped as well as doped tungsten metal bodies, in the formation of a large crystal structure and requires only a short heat treatment at a temperature considerably below the melting point. Helical filaments produced by this process are substantially free of twisting and warping when burned for a long time in electric incandescent lamps.

What we claim as new and desire to secure by Letters Patent of the United States, is:

1. The process of manufacturing tungsten bodies of large crystal structure which comprises forming by molding a blank of finely divided tungsten in a substantially pure state, sintering said blank in an atmosphere of hydrogen, and then heating said blank at approximately 2000° C. in an atmosphere of hydrogen and water vapor until crystallization occurs.

2. The process of manufacturing tungsten bodies of a large crystal structure which comprises molding a blank of finely divided tungsten in a substantially pure state, sintering said blank in a non-oxidizing atmosphere and then heating said blank at approximately 2000° C. in an atmosphere containing oxygen for a short time until crystallization occurs.

3. The process of manufacturing tungsten bodies of a large crystal structure which comprises molding a blank of finely divided tungsten in a substantially pure state, sintering said blank in a non-oxidizing atmosphere and then heating said blank at approximately 2000° C. in an atmosphere containing water vapor for a short time until crystallization occurs.

THEODORE MILLNER.
PAUL TÚRY.